United States Patent [19]

Crane

[11] 4,093,064

[45] June 6, 1978

[54] CONVEYOR PACKING STATION

[75] Inventor: Robert H. Crane, Union Lake, Mich.

[73] Assignee: Sparton Corporation, Jackson, Mich.

[21] Appl. No.: 742,618

[22] Filed: Nov. 17, 1976

[51] Int. Cl.² .................. B65G 25/04; B65G 37/00
[52] U.S. Cl. ............................... 198/485; 198/586; 198/631
[58] Field of Search ............... 198/365, 370, 436, 437, 198/448, 471, 474, 485, 456, 586, 608, 631, 594, 809; 193/35 SS, 36

[56] References Cited

U.S. PATENT DOCUMENTS

| 1,904,837 | 4/1933 | Posey | 198/631 X |
|---|---|---|---|
| 2,360,661 | 10/1944 | Eddy et al. | 198/360 X |
| 3,173,554 | 3/1965 | Ebbert | 198/469 X |
| 3,265,186 | 8/1966 | Burton | 93/35 SS X |
| 3,342,016 | 9/1967 | Bambra et al. | 198/586 X |
| 3,344,902 | 10/1967 | Crawford | 198/586 |
| 3,456,773 | 7/1969 | Titmas | 198/365 |
| 3,823,812 | 7/1974 | Sieurin | 198/485 X |

FOREIGN PATENT DOCUMENTS 629,604  11/1927  France .................................. 193/36

Primary Examiner—Evon C. Blunk
Assistant Examiner—James L. Rowland
Attorney, Agent, or Firm—Beaman & Beaman

[57] ABSTRACT

A station for inclusion in roller systems which permits cartons to be packed adjacent a primary roller conveyor and introduced onto the conveyor central region when filled. The packing station includes a carton packing conveyor movable under power driven rollers actuated when the conveyor is translated toward the primary conveyor. Simultaneously with translation of the packing conveyor transfer conveyor means are elevated between the rollers of the primary conveyor receiving the carton from the packing conveyor assuring that the carton will be substantially centered on the primary conveyor whereupon the power operated transfer conveyor lowers the carton onto the primary conveyor.

1 Claim, 4 Drawing Figures

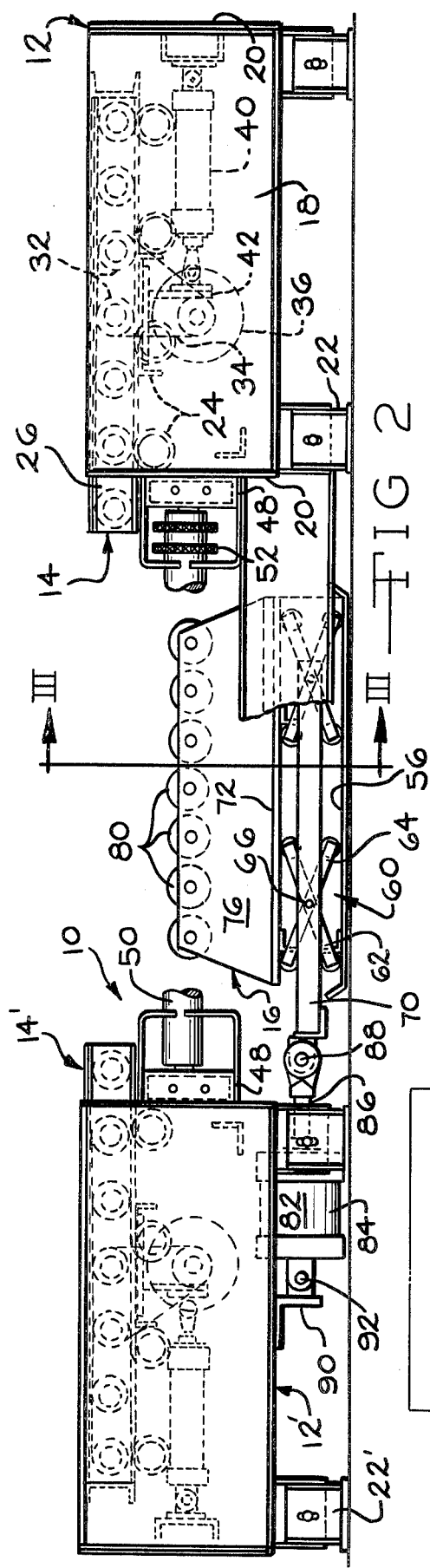
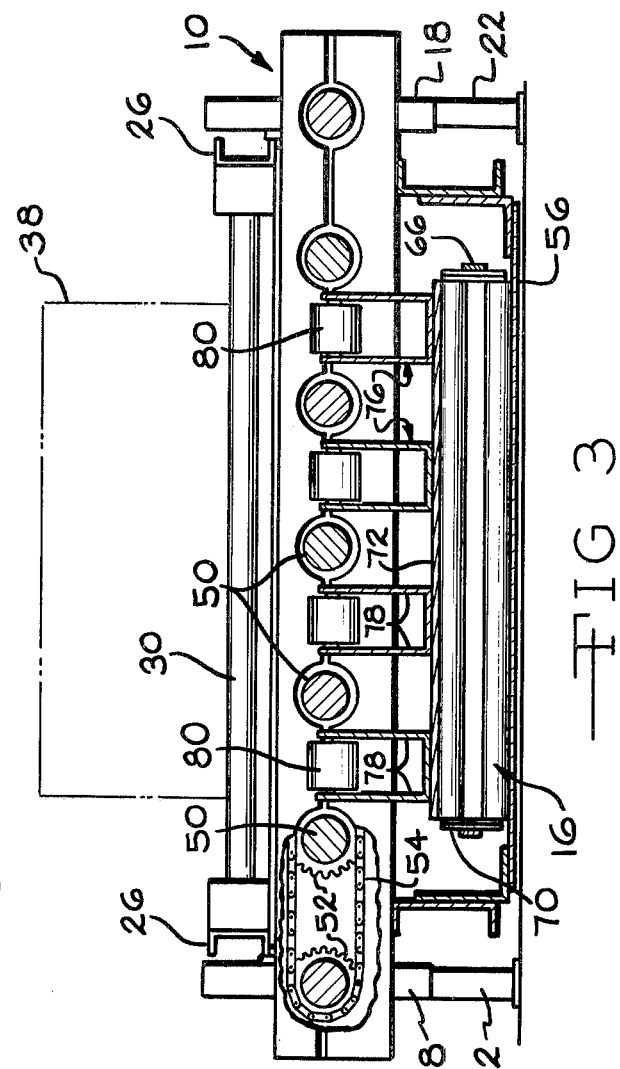
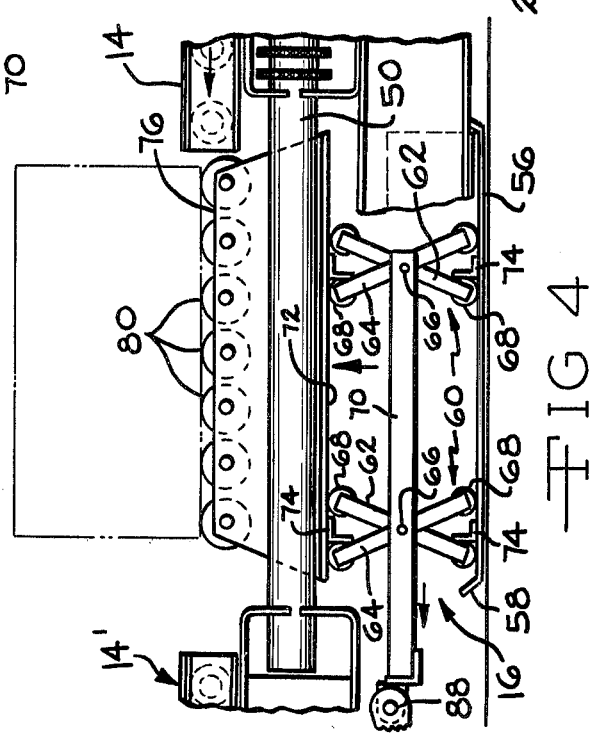
FIG 2
FIG 3
FIG 4

CONVEYOR PACKING STATION

BACKGROUND OF THE INVENTION

The invention pertains to the field of roller conveyor apparatus for introducing articles to be conveyed from an auxiliary or packing station to a primary conveyor.

Material handling apparatus commonly employs conveyors of one type or another, and roller conveyors consisting of a plurality of rollers perpendicularily disposed to the conveyor length are widely used for transporting relatively large articles having substantially flat support surfaces, such as boxes, cartons and the like. In such roller conveyor installations it is not uncommon to feed the conveyed articles to a primary conveyor from auxiliary or feeder conveyors, and in those instances where container or carton packing stations are located adjacent a primary conveyor short auxiliary or packing station conveyors are employed to transport the filled carton from the packing position to the primary conveyor.

When transferring the carton from a packing station to the primary conveyor it is necessary that the carton be substantially centrally positioned on the primary conveyor, and such positioning may be achieved by rams or push apparatus which forces the carton to the center of the primary conveyor. Also, it is known to use elevatable and retractable transfer conveyors having transversely disposed rollers located between the rollers of the primary conveyor to aid in the positioning of the carton on the primary conveyor rollers. Such transfer conveyor structure is shown in U.S. Pat. Nos. 2,360,661; 3,173,554 and 3,456,773.

One of the requirements for a conveyor packing station is that the carton being packed be at rest if hand packing is occuring, and unobstructed access to the carton from the top, back and sides thereof is necessary. Further, a positive transferring action from the packing station to the primary conveyor is necesary, and prior conveyors known to the applicant have not acheived these attributes in apparatus that is easy to operate, power driven and automatic in operation, and which may be manufactured at a moderate cost.

SUMMARY OF THE INVENTION

It is an object of the invention to provide packing station apparatus for a conveyor system wherein the packing station supports the carton or container being packed at the optimum elevation from floor level, a solid and stationary packing surface being provided wherein unobstructed access to the carton top, back and sides is acheived.

An additional object of the invention is to provide a conveyor packing station utilizing a packing conveyor having power driven rollers, the packing conveyor being translatable toward and away from a primary roller conveyor by power means, operation of the power translation means and the motor for rotating the packing conveyor rollers being synchronized with the operation of a power operated transfer conveyor disposed below the primary conveyor in alignment with the packing conveyor to recieve the carton being transferred to the primary conveyor. The transfer conveyor gently lowering the received carton to the central region of the primary conveyor under the control of power means.

An additional object of the invention is to provide a powered packing station conveyor wherein transfer of packed cartons from the packing conveyor to the primary conveyor is positive and gentle, and free of undue shock forces being transmitted to the carton being conveyed.

In the practice of the invention the packing station includes a support located adjacent the side rails of a primary roller conveyor. A packing conveyor of the roller type is mounted upon the support for translation toward and away from the primary conveyor in a direction perpendicular to the primary conveyor length. The rollers of the packing conveyor define a firm support surface for the carton or package being packed, and these rollers are driven by a motor which selectively rotates the rollers in a direction to convey the carton toward the primary conveyor. Likewise, a motor is employed to translate the packing conveyor in its entirety toward the primary conveyor during transfer.

The conveyor apparatus further includes transfer conveyor apparatus disposed below and within the primary conveyor rollers. The transfer conveyor includes a base disposed below the rollers of the primary conveyor in alignment with the direction of translation of the packing conveyor. The base supports a plurality of elongated carton receiving elements disposed between the rollers of the primary conveyor and power operated elevating means selectively raise and lower these elements to receive the carton from the packing conveyor and gently lower the carton to the central region of the primary conveyor well within the guide rails thereof.

The power means for operating the packing and transfer conveyor structure may constitute air operated expansible motors, and a rotary air motor may be employed to rotate the the rollers of the packing conveyor.

The apparatus of the invention is particularly suited for the locating of packing conveyors on opposite sides of the primary conveyor wherein two packing conveyors feed cartons to a single transfer conveyor, and operation of the packing conveyors is synchronized to limit introduction of cartons to the transfer conveyors one at a time.

BRIEF DESCRIPTION OF THE DRAWINGS

The forementioned objects and advantages of the invention will be appreciated from the following description and accompaning drawing wherein;

FIG. 2 is an end elevational view of the packing conveyor of the invention, a portion thereof being broken away to illustrate the transfer conveyor elevating mechanism, and the elevating mechanism being shown in the lowered condition, FIG. 3 is an elevational sectional view as taken along Section 111—111 of FIG. 2, and FIG. 4 is a detail elevational sectional view illustrating the transfer conveyor in the elevated position.

Figure 1:
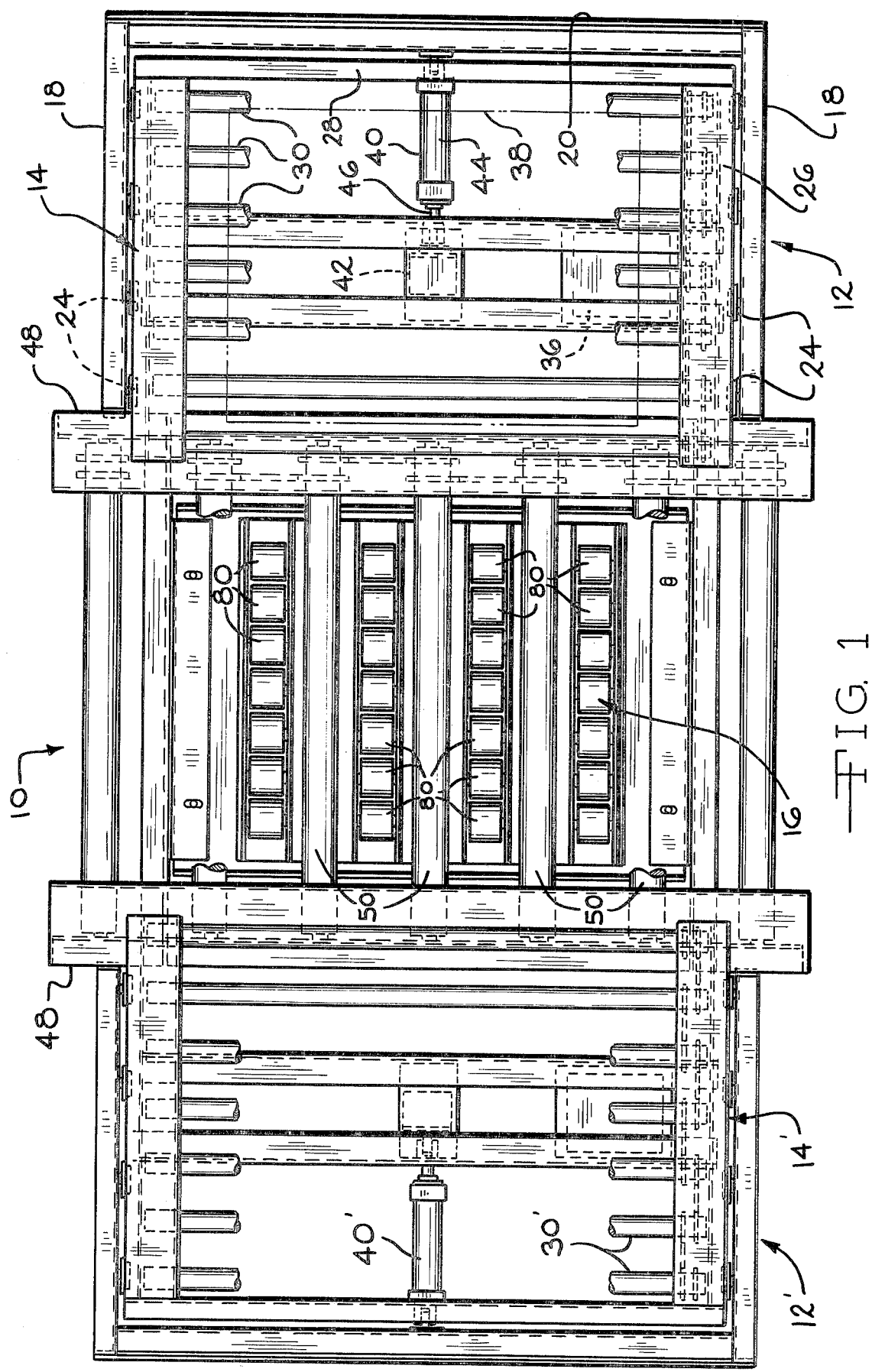
FIG. 1 is a plan view of a conveyor packing station in accord with the invention, the packing conveyors being shown in the retracted position.

DESCRIPTION OF THE PREFERRED EMBODIMENT.

In the drawings the illustrated embodiment pertains to a double packing station arrangement wherein packing conveyors are located on opposite sides of a primary roller conveyor, both packing conveyors transferring articles supported thereon to a common transfer conveyor for lowering to the primary conveyor. As this double arrangement makes the most efficent utilization of the concepts of the invention it is illustrated. However, as the structure directly associated with the packing conveyor apparatus is identical on each side of the conveyor the description relative to the packing conveyor will be singular, and indentical components of the opposed packing conveyor apparatus are indicated by primed reference numerals.

The packing station in accord with the invention may be manufactured and sold as a complete unit for direct introduction into a primary roller conveyor system. Alternatively, the apparatus may be produced for addition to an existing primary roller conveyor system. In either instance the apparatus is substantially identical, the primary distinction residing in the attachment of the packing station apparatus to the primary roller conveyor. In the disclosed embodiment the packing station is disclosed as a separate integral apparatus which may be introduced into a primary conveyor system.

Basically, the packing station apparatus includes a primary conveyor 10 which will be aligned with the primary roller conveyor system, not shown, with which the packing station is employed. The apparatus further includes support frames 12 and 12' for the packing conveyors 14 and 14', and a transfer conveyor 16 is disposed below the primary conveyor located between the packing conveyors.

The supporting frame for the packing conveyors includes side plates 18 maintained in spaced parallel relationship by end plates 20, the plates being mounted upon adjustable legs 22, FIG. 2, whereby the height of the frame may be vertically positioned within limits and locked by screws.

Four support rollers 24 are interposed between the side plates 18 for supporting the packing conveyor 14. The packing conveyor includes side channel rails 26, and an end plate 28, FIG. 1, which maintains spacing between the side rails. A plurality of rollers 30 are rotatedly mounted upon the side rails 26 by conventional bearing structure, not shown, and a pair of the central rollers 30 include drive means such as a chain 34, driven by rotary air motor 36 may be employed to rotate the powered rollers 30. The features of the drive mechanism for the central rollers 30 is conventional, and it will be appreciated that the motor 36 is preferably mounted upon a packing conveyor side rail 26 for movement with the packing conveyor in order to simplify the roller drive structure. The rollers 30 lie in the same plane and define a flat firm support surface for a carton 38 during packing.

The support rollers 24 permit the packing conveyor side rails 26 and rollers 30 to be translated toward and away from the primary conveyor 10 in a linear manner. Positioning of the packing conveyor 14 is produced by an expansible motor 40, interposed between an end plate 20, and a bracket 42 extending between the packing conveyor side rails 26. The motor 40 includes a cylinder 44 and extendable and retractable pistons 46 whereby the packing conveyor 14 will be positioned as shown in FIGS. 1 and 2 in the retracted piston position, and when the piston is extended the packing conveyor will be in position shown in FIG. 4.

The primary conveyor 10 includes side rails 48 mounted upon the inner end plates 20, and a plurality of primary conveyor rollers 50 are rotatably mounted upon the side rails in conventional bearing structure. The rollers 50 may be power driven by means of sprockets 52, FIG. 2 associating with a chain 54, FIG. 3. The chain 54 may be part of the drive apparatus for the main section of the primary conveyor, not shown, of which the primary conveyor 10 is part, or drive motor means, not shown, may be mounted upon the conveyor structure for driving chain 54 and rollers 50. It is also within the concept of the invention that the rollers 50 be idle rollers if the packing station is utilized in a gravity operated conveyor system.

The transfer conveyor 16, includes a floor plate 56 disposed below the primary conveyor 10 intermediate the packing station frames 12 and 12'. As will be appreciated from FIGS. 2 and 3, the ends of the floor plate 56 are bent upwardly at 58. A pair of scissors linkage assemblies 60 engage the floor plate 56 and each scissors linkage assembly includes a pair of crossed links 62 and 64 pivotally interconnected at 66. The ends of the links 62 and 64 include plate engagement members which may be in the form of rollers 68. The pivots 66 of the scissors linkages are interconnected by an actuating bar 70. The upper rollers 68 of the scissors linkages engage the under side of a base plate 72 which is also disposed below the primary conveyor rollers 50, and brackets 74 are affixed to the floor plate 56 and base plate 72 for cooperation with the rollers of the linkages in a manner later described.

In the disclosed embodiment four article receiving elements 76 are mounted upon the base plate 72, and these elements are of a U shape configuration having a base affixed to the base plate and vertically extending spaced legs 78. At the upper regions of the legs 78 a plurality of rollers 80 are rotatably mounted having an uppermost portion which extends above the upper ends of the lement legs as will be readily appreciated from the drawings.

As noted in FIGS. 1 and 3, the width of the elements 76 is less than the spacing between the primary conveyor rollers 50, and the elements 76 and rollers 80 are located intermediate the rollers 50 whereby elevation fo the base plate 72 and elements permits the rollers 80 to extend well above the article supporting surface defined by the rollers 50. At such elevated conditions the rollers 80 are in substantial alignment with the support surface defined by the packing conveyor rollers 30, although slightly therebelow as will be noted in FIG. 4.

When the base plate 72 and elements 76 are lowered, as shown in FIGS. 2 and 3 the uppermost portion of the rollers 80 will be disposed below the uppermost portion of the primary conveyor rollers 50.

The vertical movement of the transfer conveyor components results from the changing angular relationships of the linkages 62 and 64 as the actuater bar 70 is moved to the right or left as viewed in FIGS. 2 and 4. Translation of the bar 70 is achieved by the expansible motor 82 consisting of a cylinder 84 and extensible and contractable piston 86. The piston 86 is affixed by pivot 88 to an end of the actuater bar 70, and the cylinder 84 is affixed to the bracket 90 attached to the left frame 12' by a pivot 92. Thus, the pivots 88 and 92 permit the motor 92 to pivot and maintain a non-binding relationship with respect to the bar 70 as the bar raises and lowers during actuation of the linkages. When the piston is extended, as shown in FIG. 2, the links 62 and 64 will be relatively "flat" in configuration locating the upper rollers 68 at their lowermost position. When the pistons 86 retracts into the cylinder 84 the bar 70 is moved to the left raising the pivots 66 and changing the interrelationship of the links to raise the transfer roller conveyor. To insure proper linkage operation the left roller of each linkage is connected to its adjacent bracket 74 and it will be appreciated that the scissors linkage will maintain the base plate 72 parallel to the plane of rollers 50 during all phases of elevation and lowering.

In operation, the motor 40 will be in its retractable position locating the packing conveyor structure in its retracted position as shown in FIGS. 1 and 2. At this condition the motor 36 will not be energized and the rollers 30 will be stationary. The motor 92 will be in its extended condition wherein the transfer conveyor 16 will be lowered as shown in FIGS. 2 and 3, and if the primary rollers 50 are powered they will normally be rotating.

The operator will place the empty package or carton to be packed upon the support surface defined by the rollers 30. If an operator is located at each packing station on opposite sides of the primary conveyor 10 the packing of two cartons occurs simultaneously. The rollers 30 provide a firm, flat, support for the carton while being packed, and as no conveyor structure extends above the rollers 30 access to the carton from the top, sides and rear is uninhibited.

When it is desired to transfer a carton from the packing conveyor 14 to the primary conveyor 10 the operator actuates control means, not shown, such as a foot treadle air valve, which causes air to enter motor 40 extending the piston 46 and translating the packing conveyor and carton supported thereon to the left, FIGS. 1 and 2, toward the primary conveyor. The operation of the valve simultaneously actuates motor 82 to begin retracting piston 86 raising the transfer conveyor rollers 80 intermediate the primary rollers.

When motors 40 and 82 have completed their initial strokes the conveyor components will be as shown in FIG. 4, i.e. the packing conveyor 14 will be extended over the primary rollers 50, and the rollers 80 will be raised to a position only slightly below that of the rollers 30.

Upon completion of the initial strokes of motors 40 and 82 a sequence valve, not shown, directs an air supply to rotary motor 36 causing the motor 36 to be energized to rotate the driven packing conveyor rollers 30 in a direction to convey carton 38 thereon onto the transfer conveyor rollers 80 as shown in FIG. 4 The carton 38 is now centrally positioned relative to the primary conveyor 10, and as soon as the carton has left the innermost roller 30 the operator reverses the position of the foot treadle valve which terminates actuation of motor 30, retracts motor 40, and extends motor 82. This operation restores the packing conveyor apparatus to the retracted position of FIGS. 1 and 2, and lowers the transfer conveyor structure to the position shown in FIGS. 2 and 3. The lowering of the transfer conveyor 16 gently lowers the carton 38 to the primary conveyor rollers 50 and the carton now proceeds along the rollers 50 toward its destination. The apparatus is now in position for receiving an empty carton and the cycle is repeated.

The foot treadle actuation valves controlled by the operators at the packing stations on opposite sides of the primary conveyor 10 are interlocked such that only one packing conveyor 14 can be translated inwardly, and its rollers driven, at a time in order to prevent two cartons being simultanously deposited on the transfer conveyor. The interlocking of the control valves, and the control valves themselves, and associated conduits are not illustrated as the same are of a conventional nature well known in the air control arts.

It will therefore be appreciated that the invention provides a packing station which meets the objectives aforestated, and it is understood that various modifications to the inventive concept may be apparent to those skilled in the art without departing from the spirit and scope of the invention.

I claim:

1. A conveyor packing station for use with a primary conveyor having a longitudinal length defined by lateral side rails and a plurality of transversely disposed, spaced, parallel rollers defining a primary conveyor plane, comprising, in combination, a packing station frame disposed adjacent a primary conveyor side rail, a packing conveyor movably mounted on said packing station frame above said primary conveyor plane for movement between an extended position positioning an end of said packing conveyor adjacent and over the primary conveyor and plane thereof and a retracted position away from the primary conveyor, a plurality of rollers rotatably mounted upon said packing conveyor defining a support surface for an article to be packed, said rollers being substantially parallel to the length of the primary conveyor, motor means mounted on said packing station frame operatively connected to said packing conveyor for moving said packing conveyor between said extended and retracted positions, a transfer conveyor disposed below the primary conveyor in alignment with the direction of movement of said packing conveyor, said transfer conveyor including a base vertically movable between raised and lowered positions, a plurality of article supporting elements mounted on said base extending upwardly and located between the rollers of the primary conveyor, said elements including an upper article supporting portion which is located above and below the primary conveyor rollers at said raised and lowered positions of said transfer conveyor, respectively, said packing conveyor at said extended position being disposed adjacent said transfer conveyor at said raised position thereof, and second motor means operatively connected to said base for selectively translating said base between its raised and lowered positions, and third motor means mounted on said packing conveyor drivingly connected to at least some of said rollers thereof to move an article supported thereon toward the primary conveyor upon energizing of said third motor means.

* * * * *